US012631209B2

(12) United States Patent (10) Patent No.: US 12,631,209 B2
Massaro (45) Date of Patent: May 19, 2026

(54) ADJUSTABLE AND LOCKABLE JOINT FOR FLOOR CLEANING MACHINES

(71) Applicant: LINDHAUS S.R.L., Padua (IT)

(72) Inventor: Michele Massaro, Noventa Padovana (IT)

(73) Assignee: Lindhaus S.R.L., Padua (IT)

( * ) Notice: Subject to any disclaimer, the term of this patent is extended or adjusted under 35 U.S.C. 154(b) by 541 days.

(21) Appl. No.: 18/124,665

(22) Filed: Mar. 22, 2023

(65) Prior Publication Data

US 2023/0358271 A1 Nov. 9, 2023

(30) Foreign Application Priority Data

May 5, 2022 (IT) ......................... 102022000009203

(51) Int. Cl.
*F16C 11/10* (2006.01)
*A47L 9/32* (2006.01)
*A47L 11/40* (2006.01)

(52) U.S. Cl.
CPC ................ *F16C 11/10* (2013.01); *A47L 9/32* (2013.01); *A47L 11/4075* (2013.01);
(Continued)

(58) Field of Classification Search
CPC ......... F16C 11/04; F16C 11/10; F16C 11/103; Y10T 403/32254; Y10T 403/32262; Y10T 403/32271; Y10T 403/32426; Y10T 403/32442; Y10T 403/32541; Y10T 403/32549; Y10T 403/32557;
(Continued)

(56) References Cited

U.S. PATENT DOCUMENTS 3,758,063 A * 9/1973 Lacey .................... B60N 2/168
248/161
4,399,578 A * 8/1983 Bordeaux ........... A47L 11/4075
15/97.1
(Continued)

FOREIGN PATENT DOCUMENTS

DE 102018127090 A1 4/2020
EP 0730842 A2 * 9/1996 ........... A47L 13/253
(Continued)

OTHER PUBLICATIONS

Extended European Search Report mailed Oct. 16, 2023 in EP 23153980.0 (5 pgs.).
(Continued)

*Primary Examiner* — Amber R Anderson
*Assistant Examiner* — Kevin J Baynes
(74) *Attorney, Agent, or Firm* — Quicker Law, LLC

(57) ABSTRACT

A joint for floor cleaning machines, comprising:
a first portion,
a second portion which is articulated to the first portion,
a third portion which is articulated to the second portion;
the joint comprises:
first stable inclination element for the stable inclination of the second portion with respect to the first portion,
second stable inclination element for the stable inclination of the third portion with respect to the second portion,
the first stable inclination element and the second stable inclination element being connected to a single lever and being operable by the single lever.

8 Claims, 6 Drawing Sheets

(52) U.S. Cl.
CPC .................. *Y10T 403/32271* (2015.01); *Y10T 403/32426* (2015.01); *Y10T 403/32827* (2015.01); *Y10T 403/32844* (2015.01)

(58) Field of Classification Search
CPC ..... Y10T 403/32819; Y10T 403/32827; Y10T 403/32844; A47L 9/32; A47L 9/325; A47L 11/40; A47L 11/4075
USPC .................................................. 403/81, 166
See application file for complete search history.

(56) References Cited

U.S. PATENT DOCUMENTS

| | | | | |
|---|---|---|---|---|
| 4,568,121 | A * | 2/1986 | Kashima | B62J 1/08 297/215.15 |
| 4,664,549 | A * | 5/1987 | Lundqvist | F16B 7/14 403/104 |
| 5,327,610 | A * | 7/1994 | Smith | A47L 11/4075 15/49.1 |
| 5,398,567 | A * | 3/1995 | Specht | A47L 11/34 74/543 |
| 6,131,240 | A * | 10/2000 | Shark | A47L 11/4036 15/355 |
| 6,421,868 | B1 * | 7/2002 | Tran | A47L 11/4075 15/49.1 |
| 6,442,792 | B1 * | 9/2002 | Sudou | A47L 5/28 15/352 |
| 6,508,605 | B1 * | 1/2003 | Cheng | B62B 9/203 280/643 |
| 6,565,111 | B2 * | 5/2003 | Ageneau | B62B 9/20 280/647 |
| 6,574,831 | B2 * | 6/2003 | Hunter | A47L 5/24 15/329 |
| 6,632,170 | B1 * | 10/2003 | Bohanan | A61B 90/50 600/102 |
| 6,662,815 | B2 * | 12/2003 | Tung | A45B 17/00 135/21 |
| 6,948,197 | B1 * | 9/2005 | Chen | F16C 11/10 5/655 |
| 7,144,029 | B1 * | 12/2006 | Heady | B62J 1/08 248/125.7 |
| 7,607,196 | B2 * | 10/2009 | Li | A47L 5/28 15/350 |
| 8,025,455 | B2 * | 9/2011 | Huang | F16B 7/1418 482/121 |
| 8,567,739 | B2 * | 10/2013 | Zhou | F16M 11/10 248/397 |
| 9,267,537 | B2 * | 2/2016 | Plomteux | F21V 21/26 |
| 9,534,628 | B1 * | 1/2017 | Wang | F16C 11/10 |
| 10,966,581 | B2 * | 4/2021 | Innes | A47L 9/248 |
| 11,583,150 | B2 * | 2/2023 | Udy | A47L 5/36 |
| 11,723,499 | B2 * | 8/2023 | Leffler | A47L 9/248 15/415.1 |
| 11,771,292 | B1 * | 10/2023 | Bisson | A47L 11/4055 15/28 |
| 2022/0409003 | A1 * | 12/2022 | Protz | A47L 11/4038 |
| 2023/0346188 | A1 * | 11/2023 | Franke | A47L 11/4061 |

FOREIGN PATENT DOCUMENTS

| | | | | |
|---|---|---|---|---|
| JP | | 6435204 | B2 | 12/2018 |
| WO | WO-2016165899 | A1 * | 10/2016 | ........... A01D 34/824 |

OTHER PUBLICATIONS

Search Report mailed Dec. 14, 2022 in Italian Application No. 102022000009203 (7 pgs.).

* cited by examiner

ADJUSTABLE AND LOCKABLE JOINT FOR FLOOR CLEANING MACHINES

The present invention relates to a joint for floor cleaning machines.

The invention is usable in the industrial field, in the sector of floor cleaning machines such as, for example, floor scrubber-dryers, carpet cleaners, sweepers, single-brush machines, etc.

The invention is also advantageously usable in floor grinding machines.

Currently, in order to clean floors, machines are normally used which are provided with a cleaning portion in contact with the floor, which usually provides suction and is equipped with fixed and/or movable brushes, is connected to a motor and to the means for its operation, and a machine body containing a dirt collector and possibly a tank for water and/or detergent for the washing step.

In the field of floor cleaning machines there are basically two macrocategories:

- those for professional and industrial use, for large surfaces, normally hand-pushed and/or motorized, having considerable size and bulk,
- those for domestic use, for small surfaces, hand-pushed and/or pulled, having compact dimensions.

Considering floor cleaning machines of the domestic type, they normally have a grip and movement handle, equipped with one or more buttons, which is placed at the end of a bar, along which the longitudinally extended machine body extends, ending with a cleaning portion adapted to be in contact with the floor in the configuration for use and arranged at the end of the machine that is opposite to the one provided with the handle.

To improve its maneuverability, the machine normally comprises a joint between the machine body and the cleaning portion, which is connected to both and allows an inclination of the machine body with respect to the cleaning portion.

Such inclination is normally allowed in the plane of arrangement of the advancement direction of the cleaning portion.

There are, however, also some floor cleaning machines equipped with joints that also allow other inclinations of the machine body with respect to the cleaning portion, for example laterally, in planes that are inclined with respect to the plane of arrangement of the advancement direction of the cleaning portion.

This background art has some drawbacks.

In fact, these cleaning machines of the known type, while being able to tilt the machine body with respect to the cleaning portion, entail the drawback for the user of having to support the weight of the machine body during the work steps of the machine, especially when the machine body is tilted with respect to the cleaning portion.

Moreover, these cleaning machines of the known type, although able to tilting the machine body with respect to the cleaning portion, do not allow to maintain independently and stably the required tilt of the machine body, once achieved, but it is the user who has to act physically and with considerable effort to maintain it.

The aim of the present invention is to provide a joint for floor cleaning machines that is capable of obviating the drawbacks of the background art in one or more of the aspects cited above.

Within this aim, an object of the invention is to provide a joint for floor cleaning machines that allows the user to work without having to bear the weight of the machine body, even when tilted with respect to the cleaning portion.

Another object of the invention is to provide a joint for floor cleaning machines that allows to maintain independently and stably the required tilt of the machine body with respect to the cleaning portion, once set.

A further object of the present invention is to overcome the drawbacks of the background art in a manner that is alternative to any existing solutions.

Not least object of the invention is to provide a joint for floor cleaning machines that is highly reliable, relatively easy to provide and at competitive costs.

This aim, as well as these and other objects which will become better apparent hereinafter, are achieved by a joint for floor cleaning machines, comprising:

- a first portion,
- a second portion which is articulated to said first portion,
- a third portion which is articulated to said second portion,
- said joint being characterized in that it comprises:—
  - first means for the stable inclination of said second portion with respect to said first portion,
  - second means for the stable inclination of said third portion with respect to said second portion,
  - said first stable inclination means and said second stable inclination means being connected to a single lever and being operable by said single lever.

Further characteristics and advantages of the invention will become better apparent from the description of a preferred but not exclusive embodiment of the joint for floor cleaning machines, according to the invention, illustrated by way of non-limiting example in the accompanying drawings, wherein.

Figure 1:
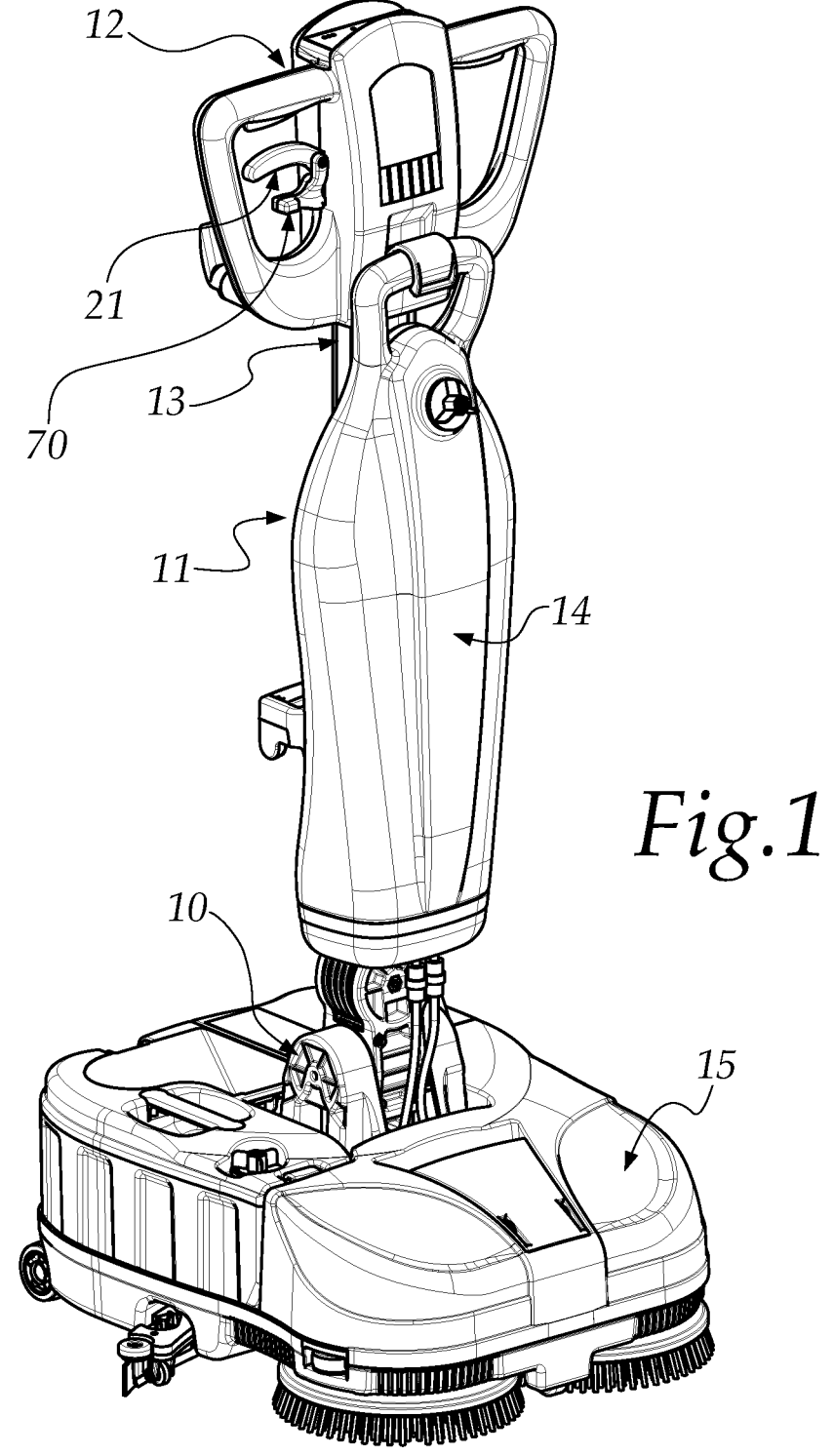
FIG. 1 is a general perspective view of a floor cleaning machine in which a joint according to the invention is used.
Figure 2:
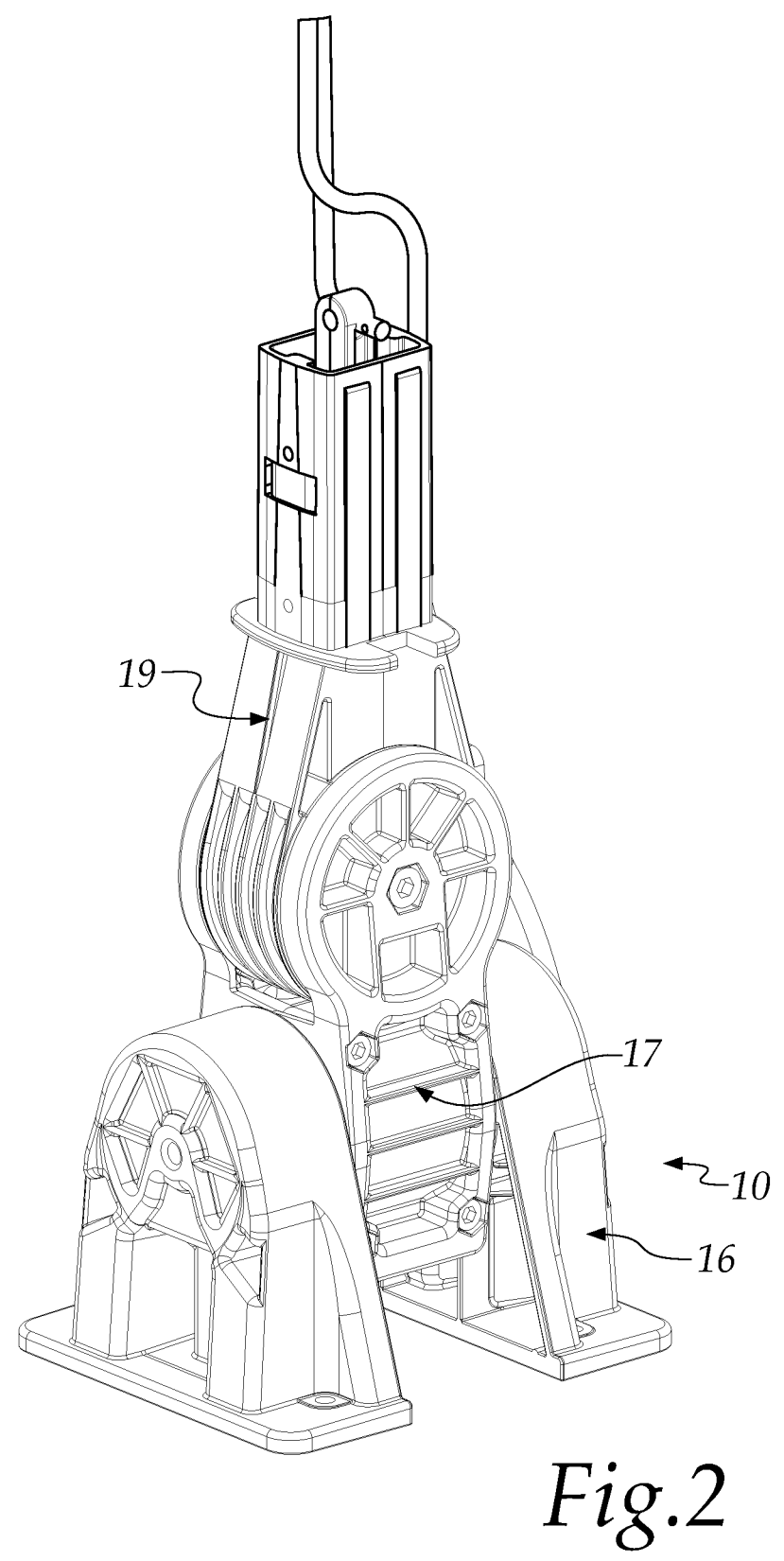
FIG. 2 is a partial and enlarged-scale perspective view, of a joint for floor cleaning machines, according to the invention.
Figure 3:
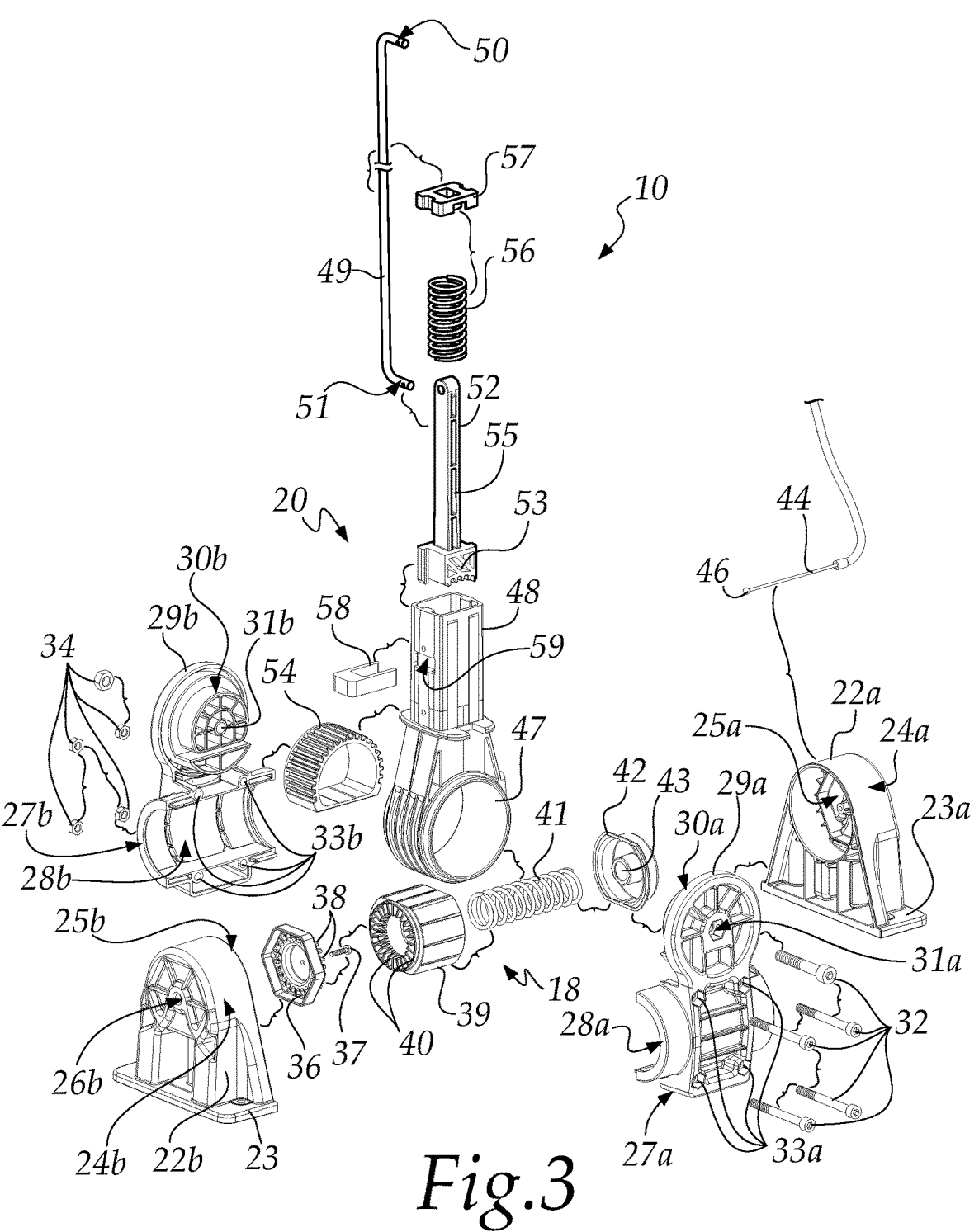
FIG. 3 is an exploded view of a joint for floor cleaning machines, according to the invention.

With reference to the figures, a joint for floor cleaning machines, according to the invention, is generally designated by the reference numeral 10.

In the example shown in FIG. 1, the joint 10 is employed in a floor cleaning machine 11 which comprises a grip and movement handle 12, provided with one or more buttons, which is placed at the end of a bar 13, along which the machine body 14 extends, contains a longitudinally extended tank and ends with a cleaning portion 15, adapted to be in contact with the floor in the configuration for use and arranged at the end of the machine 11 that is opposite the one provided with the handle 12.

The bar 13 supports the machine body 14.

The joint 10 is interposed between the cleaning portion 15 and the bar 13 and/or the machine body 14 and is adapted to mutually connect and articulate them.

The joint 10 comprises:

- a first portion 16,
- a second portion 17, articulated to the first portion 16,
- a third portion 19, articulated to the second portion 17.

One of the particularities of the invention resides in that it comprises:

first means 18 for the stable inclination of the second portion 17 with respect to the first portion 16;

second means 20 for the stable inclination of the third portion 19 with respect to the second portion 17.

In the present description, the expression "stable inclination" means that after the desired inclined configuration is reached, it is maintained, due to a locking action, and a voluntary maneuver with some effort by the user of the machine is required in order to overcome the locking action of the configuration and to be able to change the inclination again.

Another of the particularities of the invention resides in that the first means 18 for stable inclination of the second portion 17 with respect to the first portion 16 and the second means 20 for stable inclination of the third portion 19 with respect to the second portion 17 are connected to a single lever 21 placed, for example, proximate to the handle 12 of the machine 11, and can be operated by said single lever 21.

In particular, the first portion 16 is integral with the cleaning portion 15 of machine 11, while the third portion 19 is integral with the bar 13 of machine 11.

Specifically:

the first means 18 allow an inclination of the machine body 14 with respect to the cleaning portion 15 in the plane of arrangement of the front advancement direction of the latter, the second means 20 allow an inclination of the machine body 14 with respect to the cleaning portion 15 in a plane that is perpendicular to the preceding one and coincides with the plane of arrangement of the lateral advancement direction of the cleaning portion 15.

The first portion 16 comprises two mirror-symmetrical first half-shells 22a, 22b, respectively a first first half-shell 22a and a second first half-shell 22b.

Each of the two first half-shells 22a, 22b is provided with:

a base 23a, 23b, for association with the cleaning portion 15 of the machine 11, a bay 24a, 24b, which is monolithic with the base 23a, 23b, has a substantially triangular contour and forms a tray-like seat 25a, 25b, with an axis of extension that is parallel to the plane of arrangement of the base 23a, 23b, and provided with a first through hole 26a, 26b.

The second portion 17 comprises two mirror-symmetrical second half-shells 27a, 27b, respectively a first second half-shell 27a and a second second half-shell 27b.

Each of the two second half-shells 27a, 27b is provided with:

a first slotted part 28a, 28b, a second part 29a, 29b, having a substantially circular contour, which is monolithic with the first part 28a, 28b and supports a protrusion 30a, 30b directed toward the inside of joint 10 and provided with a second through hole 31a, 31b.

The two second half-shells 27a, 27b are associated and mutually fixed by using a plurality of first fixing screws 32, optionally secured by respective nuts 34, which are inserted in corresponding through holes provided in the respective second half-shells 27a, 27b, for example one in the second through hole 31a, 31b and four in as many third through holes 33a, 33b provided on the first part 28a, 28b, at the longitudinal edges of the respective slot.

In particular, the association between the first part 28a of the first second half-shell 27a and the first part 28b of the second second half-shell 27b forms a tubular receptacle 35 for first means for locking/releasing the first means 18 for the stable inclination of the second portion 17 with respect to the first portion 16.

The two longitudinal ends of the tubular receptacle 35 are inserted with play, each in a respective and complementarily shaped tray-like seat 25a, 25b of a corresponding first half-shell 22a, 22b, providing a hinge between the first portion 16 and the second portion 17.

The first means for the locking/release of the first means 18 for stable inclination of the second portion 17 with respect to the first portion 16 comprise, along the axis of extension of the tubular receptacle 35, in the following order:

a hexagonally shaped ring 36, fixed within the bay 24b of the second first half-shell 22b, in the respective tray-like seat 25b, by means of a second fixing screw 37, and at least perimetrically shaped complementarily thereto, such ring 36 being provided with a plurality of first teeth 38 directed toward the other bay 24a, a drum 39, provided with a plurality of second teeth 40 directed toward the first teeth 38 and adapted to engage with them, generating interference in a locking configuration, said drum 39 having a first central tubular segment 45, a first helical spring 41, adapted to push the drum 39 against the ring 36, an element 42 for the abutment and guiding of the first spring 41, which is inserted and retained between the two second half-shells 27a and 27b, said element 42 having a tray-like outline with a second central tubular segment 43, around which the first spring 41 is arranged at least partially, a cable 44, which is inserted in the first through hole 26a of the tray-like seat 25a of the first first half-shell 22a and passes in the following order through:

the second tubular segment 43 of the abutment and guiding element 42 of the first spring 41, the first spring 41, the first tubular segment 45 of the drum 39, to which it is fixed, at a first wider end 46, by interference/interlocking/end ball of the cable.

The cable 44 is of suitable strength, for example made of steel, and is connected at its second end, not shown in the figures, to the lever 21 of the machine 11.

The third portion 19 comprises:

a first section 47, having an annular contour, a second section 48, having a tubular contour, extending from the first section 47 monolithically therewith and radially with respect to its central axis of rotation, said second section 48 communicating internally with the interior of the first section 47.

The second section 48 is adapted to be associated with the bar 13 of the machine 11 by inserting it at least partially inside it.

In particular, the first section 47 is enclosed between second part 29a of the first second half-shell 27a and the second part 29b of the second second half-shell 27b, and is coupled to them by shape mating, with the ability to rotate about its own central axis of rotation, which substantially coincides with and/or is parallel to the axis of extension of the second through hole 31a, 31b.

In this way a hinge is provided between the second portion 17 and the third portion 19.

The second means 20 for stable inclination of the third portion 19 with respect to the second portion 17 comprise second locking/release means.

Such second means for the locking/release of the second means 20 for stable inclination of the third portion 19 with respect to the second portion 17 comprise:

a rod 49, connected at a first end 50 thereof to the lever 21 and at a second end 51 thereof to a longitudinal element 52, the longitudinal element 52, which can slide within the second section 48 of the third portion 19 and is provided with a stem 55 which ends with a wider and toothed end 53 which is opposite to the end for connection to the rod 49, a rack element 54, adapted to engage the wider and toothed end 53 of the longitudinal element 52 in the configuration for the locking of the second means 20, the rack element having a substantially D-shaped profile, being inserted within the first section 47 of the third portion 19, being enclosed between the second part 29a of the first second half-shell 27a and the second part 29b of the second second half-shell 27b, and being coupled to them by shape mating/interlocking with the projections 30a, 30b thereof, a second helical spring 56 which surrounds at least partially the stem 55 of the longitudinal element 52 and is adapted to push the wider and toothed end 53 toward the rack element 54, the second helical spring 56 being provided with a first end in contact with the wider and toothed end 53 and with a second end in contact with an abutment element 57, the element 57 for the abutment of the second helical spring 56 and for guiding the stem 55, which surrounds the latter at the second end of the second helical spring 56 that is opposite to its first end, the element 57 for the abutment of the second helical spring 56 and for guiding the stem 55 being inserted within the second section 48 of the third portion 19 and having an outer perimetric profile that is comparable with the inner transverse profile of the second section 48 of the third portion 19, a block 58, of the element 57 for the abutment of the second helical spring 56 and for guiding the stem 55, which is provided with a U-shaped profile and at least partially surrounds the stem 55, the block 58 being inserted in the second section 48 of the third portion 19 through an opening 59 thereof, generating an interference/interlocking with the latter and stopping any sliding of the element 57 for the abutment of the second helical spring 56 and for guiding the stem 55 being in contact with said element 57.

Advantageously, the lever 21 is kinematically connected to an auxiliary locking lever 70 adapted to:

lock it in the release position of the means for the locking/release of the first means 18 and the second means 20, to allow the free movement of the joint 10, lock it in the engagement position of the means for the locking/release of the first means 18 and the second means 20, to prevent accidental releases of the lever 21 at the desired inclination.

Moreover, when the auxiliary lever 70 is disengaged from the lever 21, the latter can operate freely by locking/releasing joint 10 as needed.

Figure 4:
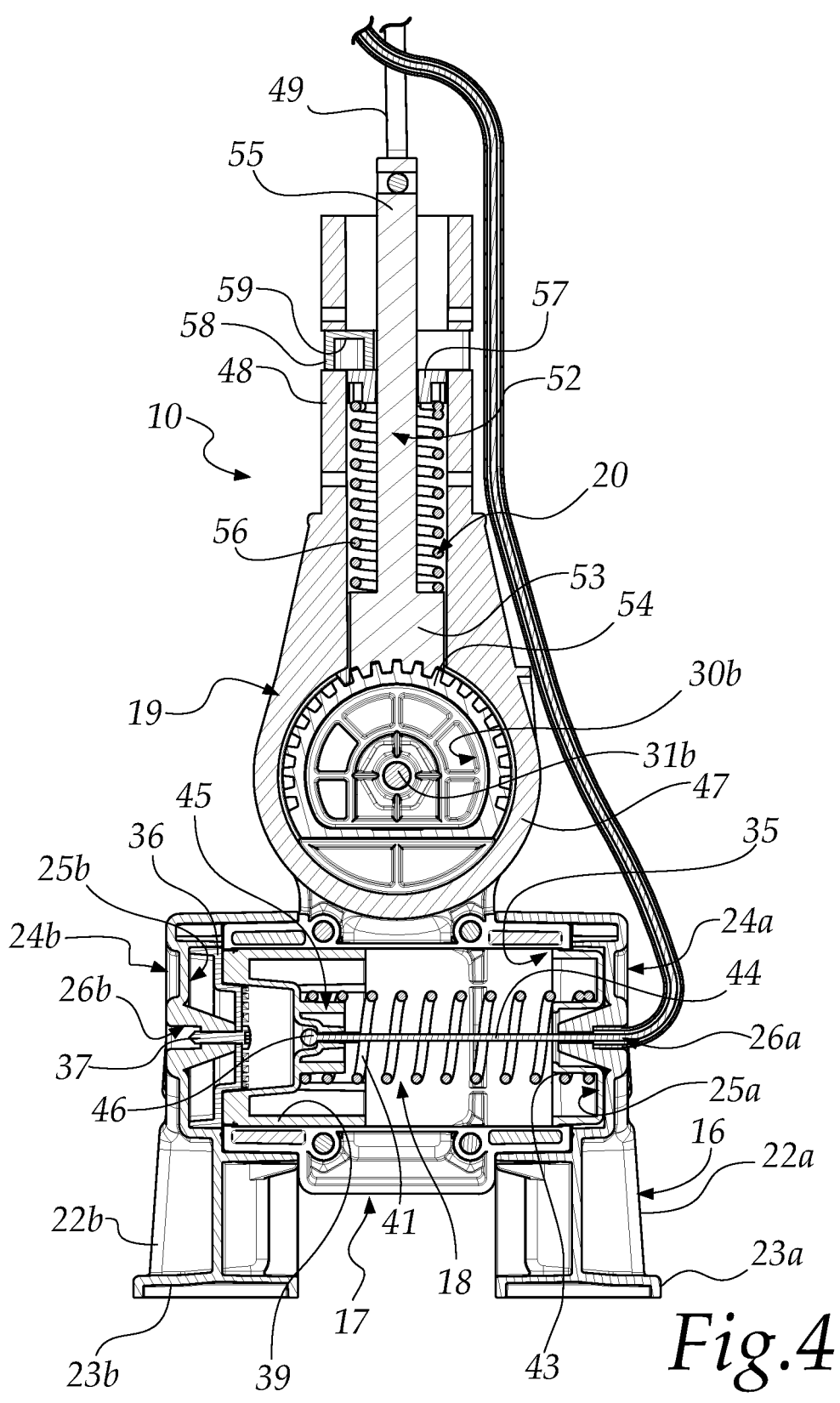
FIG. 4 is a sectional side view of the joint of FIG. 2, in a first configuration.
Figure 5:
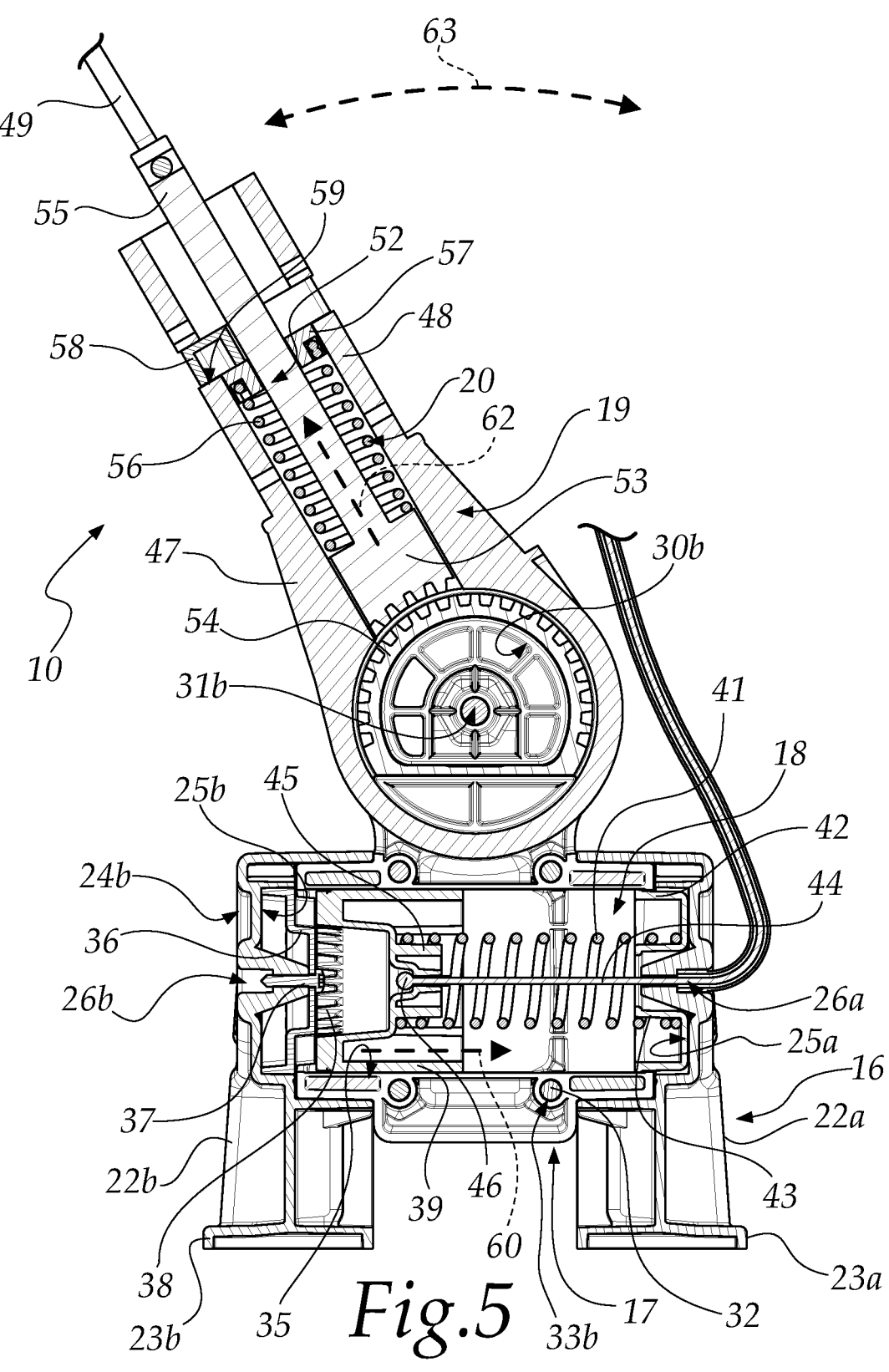
FIG. 5 is a view in the same lateral cross-section as FIG. 4, but with the joint in a second configuration.
Figure 6:
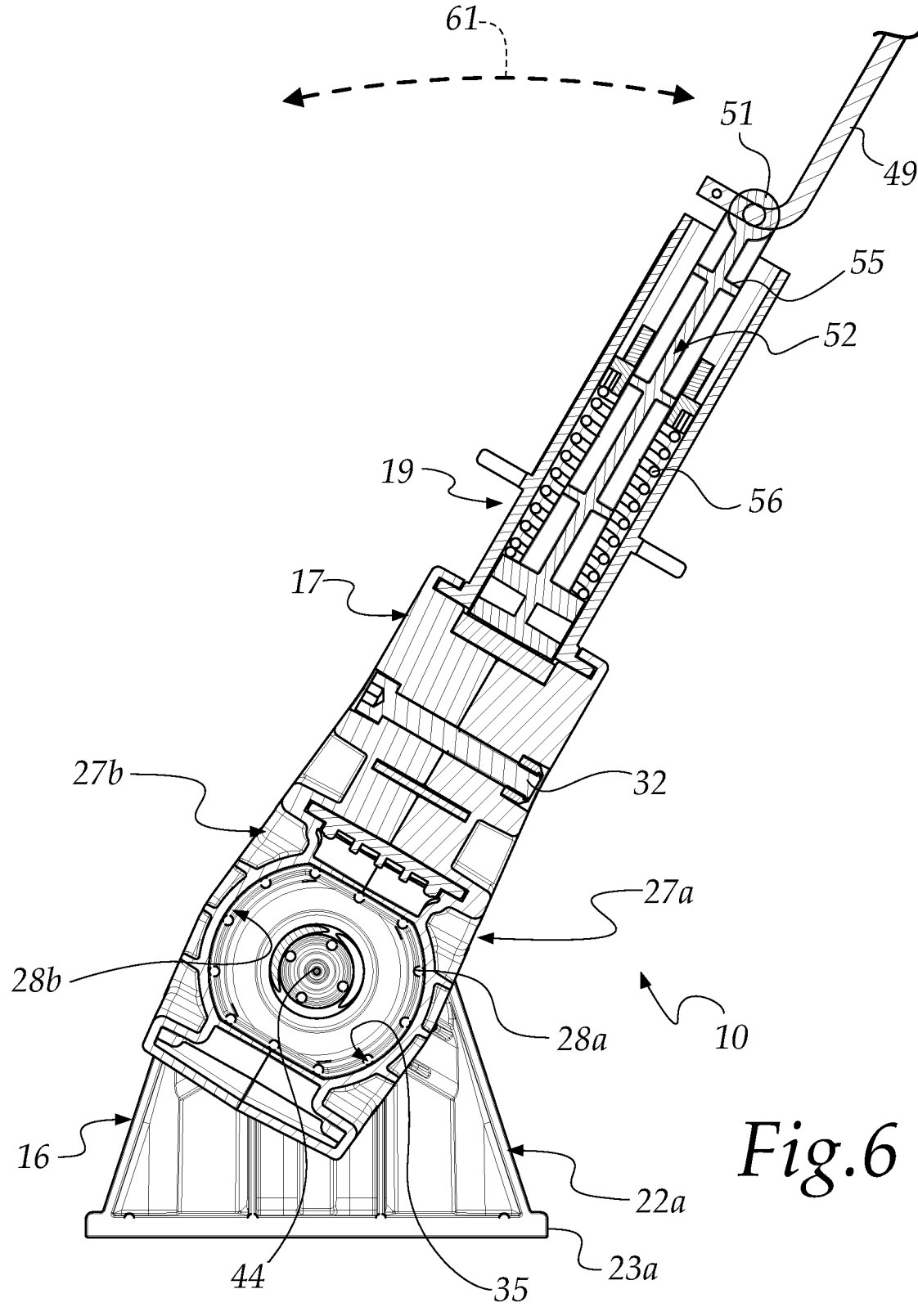
FIG. 6 is a different sectional side view of the joint in FIG. 2, in a third configuration.

The operation of the joint 10, according to the invention, is shown in FIGS. 4 to 6 and is as follows.

In the inactive position, FIG. 4:

the drum 39 is engaged with the ring 36 by the action of the first helical spring 41, preventing a change in inclination of the second portion 17 with respect to the first portion 16, the longitudinal element 52 is engaged with the rack element 54 by the action of the second helical spring 56, preventing a change in inclination of the third portion 19 with respect to the second portion 17.

When the user wants to change the inclination of the second portion 17 with respect to the first portion 16 and/or of the third portion 19 with respect to the second portion 17, he operates the lever 21 of the machine 11, moving both the cable 44 and the rod 49, FIGS. 5 and 6.

In particular, by moving the lever 21:

the cable 44 moves the drum 39, disengaging it from the ring 36 (arrow 60 in FIG. 5), allowing the second portion 17 to tilt with respect to the first portion 16, according to the movement indicated by the arrow 61 in FIG. 6, the rod 49 moves the longitudinal element 52, disengaging it from the rack element 54 (arrow 62 of FIG. 5), allowing the third portion 19 to tilt with respect to the second portion 17, according to the movement indicated by the arrow 63 of FIG. 5.

In practice it has been found that the invention achieves its intended aim and objects, providing a joint for floor cleaning machines that allows the user to work without having to bear the weight of the machine body, even when tilted with respect to the cleaning portion.

The invention provides a joint for floor cleaning machines that allows to maintain independently and stably the required inclination of the machine body with respect to the cleaning portion once set.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102022000009203 from which this application claims priority are incorporated herein by reference.

What is claimed is:

1. A joint for floor cleaning machines, comprising:
a first portion,
a second portion which is articulated to said first portion,
a third portion which is articulated to said second portion,
said joint further comprising:
first stable inclination means for a stable inclination of said second portion with respect to said first portion,
second stable inclination means for a stable inclination of said third portion with respect to said second portion,
wherein said first stable inclination means and said second stable inclination means being connected to a single lever and being operable by said single lever, and
wherein said first portion comprises two mirror-symmetrical first half-shells, respectively a first mirror-symmetrical first half-shell and a second mirror-symmetrical first half-shell, each one of said first and second mirror-symmetrical first half-shells having
a base, and
a bay, which is monolithic with said base, having a substantially triangular contour and which forms a tray-like seat with an axis of extension that is parallel to a plane of arrangement of said base and is provided with a first through hole.

2. The joint according to claim 1, wherein said single lever is kinematically connected to an auxiliary locking lever.

3. The joint according to claim 1, wherein said second portion comprises two mirror-symmetrical second half-shells, respectively a first second half-shell and a second second half-shell, each one of said two second half-shells having:

a first slotted part, a second part which has a substantially circular contour and is monolithic with said first slotted part, said second part bearing a protrusion directed toward an inside of said joint and having a second through hole, said first and second second half-shells being associated and mutually fixed by using a plurality of first fixing screws.

4. The joint according to claim 3, wherein the association between said first slotted part of said first second half-shell and said first slotted part of said second second half-shell forms a tubular receptacle for first means for locking/release of said first stable inclination means for the stable inclination of said second portion with respect to said first portion, two longitudinal ends of said tubular receptacle each being respectively inserted, with play, within the tray-like seats of the first half-shells, providing a hinge between said first portion and said second portion.

5. The joint according to claim 4, wherein said first means for locking/release of said first stable inclination means for the stable inclination of said second portion with respect to said first portion comprise, along an extension of said tubular receptacle, in the following order:

a ring, which is fixed inside said bay of said second first half-shell, in the respective tray-like seat, and is at least perimetrically shaped complementarily thereto, said ring having a plurality of first teeth which are directed toward said bay of said first first half-shell, a drum, provided with a plurality of second teeth which are directed toward said first teeth and are adapted to engage said first teeth, generating an interference in a locking configuration, said drum having a first central tubular segment, a first helical spring, which is adapted to push said drum against said ring, an element for abutment and guiding of said first spring, which is inserted and retained between said two second half-shells, said element for the abutment and guiding of said first spring having a tray-like contour with a second central tubular segment, around which said first spring is at least partially arranged, a cable, which is inserted in said first through hole of said tray-like seat of said first first half-shell and crosses in the following order:

said second tubular segment of said element for abutment and guiding of said first spring, said first spring, said first tubular segment of said drum, the cable having a wider first end thereof which is fixed to the first tubular segment of the drum by way of an end ball at the first end of the cable, or through an interference or interlocking fit, said cable being connected to said single lever at a second end of the cable thereof.

6. The joint according to claim 3, wherein said third portion comprises:

a first section, which has an annular contour, a second section, which has a tubular contour and extends from said first section, monolithically therewith and radially with respect to a central axis of rotation thereof, said second section communicating internally with an inside of said first section.

7. The joint according to claim 6, wherein said first section is enclosed between said second part of said first second half-shell and said second part of said second second half-shell, and is coupled thereto by shape mating, and configured to rotate about its own central axis of rotation.

8. The joint according to claim 6, wherein said second stable inclination means for the stable inclination of said third portion with respect to said second portion comprise second locking/release means, said second locking/release means comprising:

a rod, which is connected at a first end thereof to said single lever and at a second end thereof to a longitudinal element, said longitudinal element, which can slide within said second section of said third portion and has a stem which ends with a wider and toothed end which is opposite to an end for connection to said rod, a rack element, which is adapted to engage said wider and toothed end in a configuration for locking said second means for the stable inclination of said third portion with respect to said second portion, said rack element having a substantially D-shaped profile and being inserted within said first section of said third portion, said rack element being enclosed between said second part of said first second half-shell and said second part of said second second half-shell and being coupled to them by shape mating or interlocking with the protrusions thereof, a second helical spring, which surrounds at least partly said stem of said longitudinal element and is adapted to push said wider and toothed end toward said rack element, said second helical spring having a first end in contact with said wider and toothed end and a second end in contact with an abutment element, said abutment element abuts said second helical spring and guides said stem, said abutment element surrounds said stem at said second end of said second helical spring that is opposite to the first end thereof, said abutment element being inserted within said second section of said third portion and having an external perimetric profile that corresponds to an internal transverse profile of said second section of said third portion, and a block having a U-shaped profile and surrounding at least partially said stem, said block being inserted in said second section of said third portion through an opening thereof, generating an interference or interlock with the third portion and configured to stop a sliding of said abutment element, said block being in contact with said abutment element.

* * * * *